United States Patent [19]
Kautz et al.

[11] 3,758,003
[45] Sept. 11, 1973

[54] HOT MELT LIQUEFYING AND PUMPING MECHANISM

[75] Inventors: Wilbert G. Kautz; Dale F. German, both of Bryan, Ohio

[73] Assignee: The Aro Corporation, Bryan, Ohio

[22] Filed: Dec. 20, 1971

[21] Appl. No.: 209,671

[52] U.S. Cl. ............. 222/146 R, 222/405, 137/341
[51] Int. Cl. ........................ B67d 5/62, F16k 49/00
[58] Field of Search .................... 222/146 R, 146 H, 222/146 HA, 146 HE; 137/341

[56] References Cited
UNITED STATES PATENTS

| | | | |
|---|---|---|---|
| 3,282,469 | 11/1966 | Skonberg | 222/146 HE |
| 3,412,903 | 11/1968 | Riper, Jr. et al. | 222/146 R |
| 3,637,111 | 1/1972 | McCreary | 222/146 H |
| 3,031,106 | 4/1962 | Hooker | 222/146 H |
| 3,130,876 | 4/1964 | Baker | 222/146 HE |
| 3,456,849 | 7/1969 | Sjostrand | 222/146 R |
| 3,459,336 | 8/1969 | Ruud | 222/146 R |
| 3,478,930 | 11/1969 | Rigby | 222/146 R |
| 3,531,023 | 9/1970 | Mercer | 222/146 HE |
| 3,662,927 | 5/1972 | Cocks | 222/146 HE |

Primary Examiner—Samuel Scott
Attorney—A. W. Molinare et al.

[57] ABSTRACT

A mechanism for melting and discharging hot melt material from a barrel includes a hot plate which fits through the top of the barrel and melts the hot melt material adjacent the bottom side of the plate. A pump operates to draw the melted hot melt material from the region between the plate and the unmelted material for discharge through a flexible hose.

5 Claims, 3 Drawing Figures

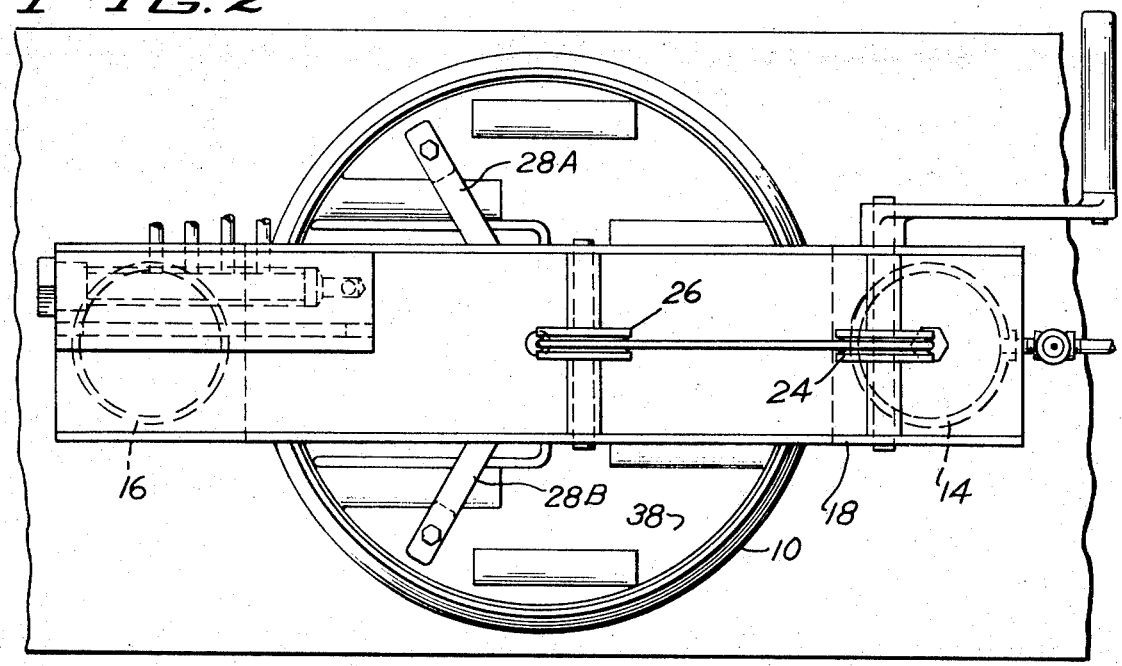
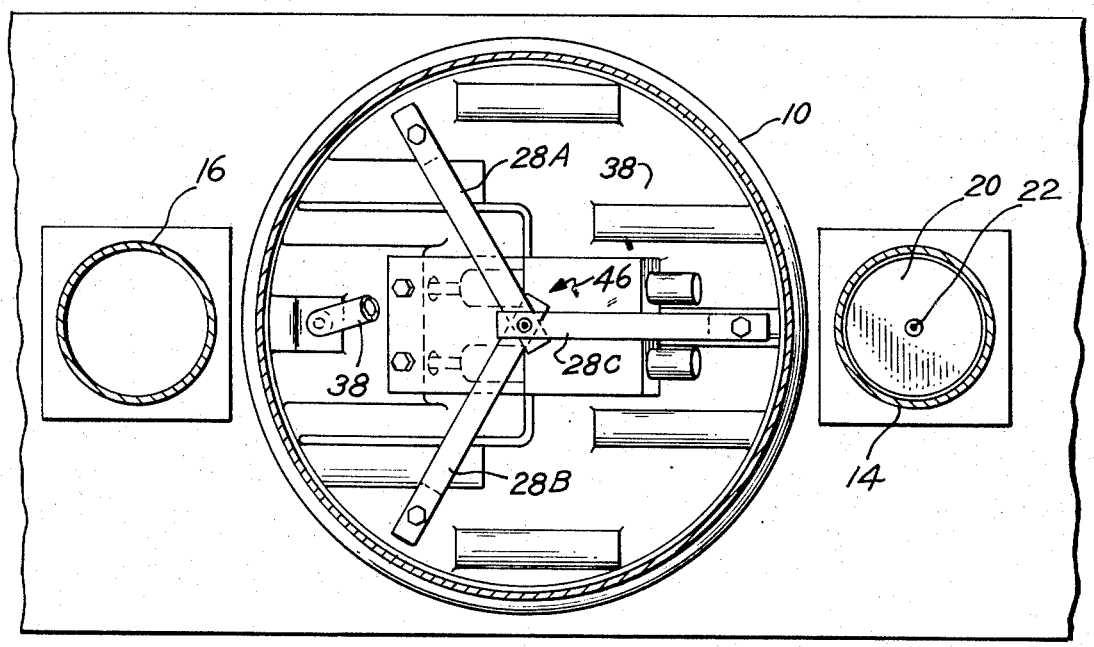

HOT MELT LIQUEFYING AND PUMPING MECHANISM

BACKGROUND OF THE INVENTION

In a principal aspect, the present invention relates to an improved mechanism for pumping a hot melt adhesive from a barrel-like container.

Hot melt adhesives are used for numerous applications requiring the fastening of materials together. For example, such adhesives are utilized in the manufacture of paper crating and boxes. Generally, such adhesives are solid at room temperature and are stored in a solid block or granular form. The solid material may then be utilized by a dispenser which operates to melt the hot melt adhesive and maintain it at an appropriate temperature until it is discharged from a glue gun or the like for the desired application.

A desirable way of transporting solid hot melt material is in fifty-five gallon steel drums. If the hot melt adhesive is retained as a solid block of material in the drum, difficulties arise when removing the hot melt material.

That is, the material may be liquefied for removal by heating the drum in some manner. Alternatively, the hot melt material may be in a granular form which is easily removed. However, granularizing the hot melt material reduces the shipping density and increases handling costs.

Recently, it has been proposed to provide a device which melts the hot melt adhesive in the drum for direct utilization therefrom without transportation from the drum to a utilization site for melting by an appropriate dispensing apparatus. The present invention is a mechanism which is cooperable with a drum or barrel filled with hot melt material to liquefy and remove a selected portion of hot melt adhesive from the drum.

SUMMARY OF THE INVENTION

In a principal aspect, the improvement of the present invention is a mechanism for removing meltable material from a container. The mechanism includes a plate which can be heated and placed adjacent the material in the container to liquefy the material therein. Pump means are provided for pumping the liquefied material through a passage in the plate for use external from the container.

It is thus an object of the present invention to provide an improved mechanism for removing material, particularly hot melt material from a container.

It is a further object of the present invention to provide a mechanism which will melt the top portion of material in a container and then remove the liquefied material from the container.

Still another object of the invention is to provide a heated plate which may be adjustably positioned in a container.

One further object of the present invention is to provide a heated plate which is counterbalanced to float at an appropriate depth in material which is liquefied by the heated plate.

These and other objects, advantages and features of the present invention will be set forth in greater detail in the description which follows.

BRIEF DESCRIPTION OF THE DRAWING

In the detailed description which follows, reference will be made to the drawing comprised of the following figures:

FIG. 2 is a top, plan view of the mechanism shown in FIG. 1; and

FIG. 3 is a cross-sectional top, plan view of the mechanism shown in FIG. 1 taken substantially along the line 3--3 in FIG. 1.

DESCRIPTION OF THE PREFERRED EMBODIMENT

Figure 1:
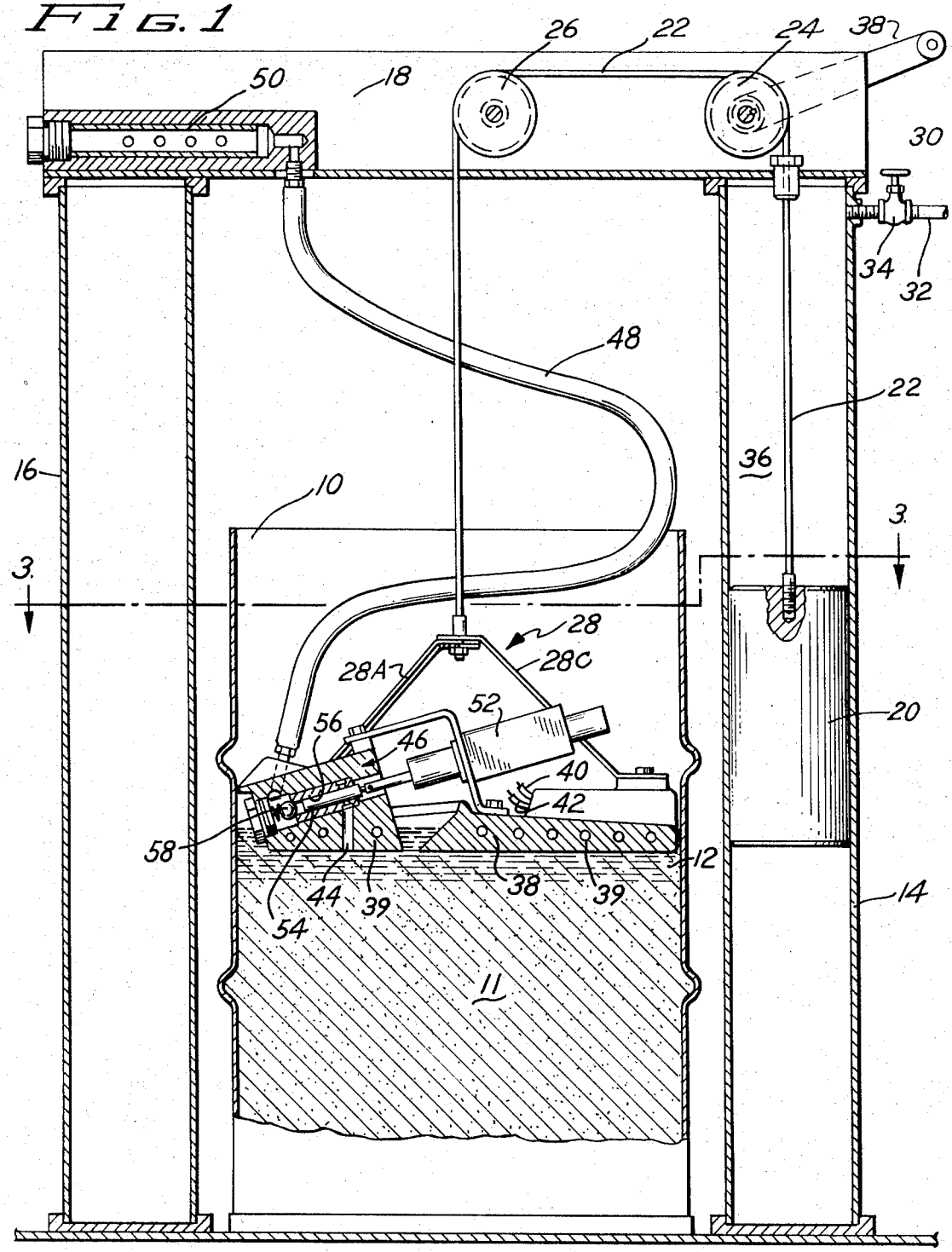
FIG. 1 is a cross-sectional, front, plan view of the improved material pumping mechanism of the present invention.

In the drawing, like numbers refer to like parts in each of the figures. Referring to the drawing, the mechanism of the present invention may be utilized to operate with any desired type of container having an open top. For the purposes of description of the invention, a typical fifty-five gallon drum 10 is illustrated. Drum 10 is utilized as a container for hot melt adhesive material 11 either solid or granular. The mechanism of the invention operates to melt the hot melt adhesive material 11 in a manner which produces a liquid material or region 12 at the top of the material 11 in the container 10. Beneath the liquid region 12 is solid hot melt material.

The mechanism is comprised of a pair of spaced, hollow, cylindrical posts 14 and 16 with a beam 18 extending between the top of the posts 14 and 16. One of the posts 14 includes a counterweight 20 slidably positioned therein. The counterweight 20 may thus slide vertically on the interior of the post 14.

A cable 22 extends over an idler pulley 24 and idler pulley 26 on beam 18 and connects with a support bracket 28. The cable 22 passes through a seal 30 at the top of post 14. An air pressure line 32 having a control valve 34 connects with the internal chamber 36 defined by the hollow posts 14 and counterweight 20. Thus, air or fluid may be introduced or released from the chamber 36 to control the movement of the counterweight 20 and thus the tension on the cable 22 for removal of the pumping mechanism from the drum 10. An alternative method of controlling the tension on the cable 22 is by means of crank 38 connected to pulley 24. The pulley 24 is thus constructed to frictionally grip or drive the cable 22.

Bracket 28 comprised of three bracket legs 28A, 28B and 28C. The legs 28A, 28B and 28C are attached to a heating plate 38. The plate 38 is heated by electric heating elements or coils 39 embedded in the plate 38. Lead wires 40 and 42 provide electric power to heating coils 39 embedded in the plate 38. The temperature of the plate 38 may thus be thermostatically controlled by control of the power through the lead wires 40 and 42 to the coils 39 in the plate 38.

A fluid flow passage 44 is also defined in the plate 38. The fluid flow passage 44 connects with a pump mechanism 46 which operates to pump fluid from the liquid region 12 and through a flexible hose 48 to a hot melt fluid discharge manifold 50 mounted in beam 18. A typical pump mechanism 46 and a mechanism of the type preferred is described and claimed in U.S. application Ser. No. 794,476 filed Oct. 9, 1970 which is now abandoned. Application Ser. No. 794,476 is incorporated herewith by reference. This pump mechanism 46 operates to pump the liquid hot melt material at a substantially uniform pressure through the manifold 50 via hose 48.

The pump mechanism is comprised of a fluid driven piston 52 which reciprocally drives a pumping piston 54 in a cylinder chamber 56. As the piston 54 is withdrawn to the right in FIG. 1 to expose passage 44, liquid hot melt material 12 flows into the chamber 56 where it is prevented from further flow by check valve 58. Material liquid 12 flows through passage 44 into chamber 56 due to the partial pressure in the chamber 56 of plate 38 created by withdrawing piston 54. That is, plate 38 is preferably, at least, partially submerged in liquid material 12. The liquid material thus fills the region about the circumference of a plate 38 as well as partially into passage 44. The partial pressure in chamber 56 is relieved by the flow of liquid material 12 through passage 44 to chamber 56. This partial pressure is provided because the plate 38 which floats in or on the liquid material 12 effectively seals the passage 44 from the atmosphere. Thus, the force of atmospheric pressure tends to force liquid material 12 into passage 44 and chamber 56 whenever the pressure in chamber 56 is less than atmospheric. On the return stroke of piston 54, passage 44 is sealed by piston 54 and liquid hot melt material 12 is forced through valve 58 and thence through hose 38.

As inferred above, the plate 38 is designed to have substantially the same circumferential configuration as the container or barrel 10, although the diameter of plate 38 is in fact somewhat smaller, as illustrated, in order to permit the plate to float and follow the liquid 12 level. Thus, as the hot melt material 11 is liquefied and removed, the plate 38 uniformly melts the hot melt material 11 in a horizontal plane at the top surface of the material 11. Simultaneously, the plate 38 lowers into the container or barrel 10. Lowering of the floating plate 38 is achieved by gravity means since the counterweight 20 does not entirely act to counter the weight of the plate 38. The counterweight 20 merely prevents the weight of the plate 38 to cause sinking into the hot melt material beyond a predesired limit. The counterweight 20 thus provides the plate 38 with a buoyancy effect so that the bottom of plate 38 will float at a desired depth below the top liquid level of the hot melt material 11 in the barrel 10.

While in the foregoing there has been provided a description of the preferred embodiment of the present invention, it is to be understood that the invention is to be limited only by the appended claims and their equivalents.

What is claimed is:

1. An improved mechanism for removing meltable material from a container, said container of the type having an open side, said mechanism comprising, in combination: plate means to fit in said open side of said container adjacent said material in said container; heating means in said plate means for melting at least a portion of said material adjacent the bottom of said plate means; liquid material passage means through said plate means in communication with said melted material for conveyance of said melted material; pump means for pumping melted material through said passage; and means to counterweight said plate means and other means thereon, said plate means effectively sealing said passage means from the atmosphere while simultaneously floating on said liquid as said liquid is removed from said container.

2. The mechanism of claim 1 wherein plate means is floating partially submersed in said melted material.

3. The mechanism of claim 1 including additional means for positioning said other means into or out of said container.

4. The mechanism of claim 1 wherein said passage includes flexible hose means extending from said pump means to melted material outlets.

5. The mechanism of claim 1 wherein said pump means is cyclic and includes means to provide a partial pressure in said passage means, said liquid material flowing into said passage to eliminate said partial pressure condition, said pump means further including means for removing liquid in said passage and reestablishing a partial pressure therein.

* * * * *